(12) United States Patent
Reshidko et al.

(10) Patent No.: US 8,662,765 B2
(45) Date of Patent: Mar. 4, 2014

(54) WAFER LEVEL OPTICS

(75) Inventors: Pavel Reshidko, Tel-Aviv (IL); Kai Engelhardt, Buckenhof (DE); Ephraim Goldenberg, Tel-Aviv (IL); Michael Dror, Tel-Aviv (IL)

(73) Assignee: DigitalOptics Corporation, San Jose, CA (US)

( * ) Notice: Subject to any disclaimer, the term of this patent is extended or adjusted under 35 U.S.C. 154(b) by 309 days.

(21) Appl. No.: 13/089,076

(22) Filed: Apr. 18, 2011

(65) Prior Publication Data
US 2011/0255856 A1    Oct. 20, 2011

Related U.S. Application Data

(60) Provisional application No. 61/325,036, filed on Apr. 16, 2010.

(51) Int. Cl.
*G03B 17/00* (2006.01)
*G02B 13/18* (2006.01)
*G02B 9/08* (2006.01)

(52) U.S. Cl.
USPC .................. 396/439; 359/717; 359/738

(58) Field of Classification Search
USPC .......... 396/439, 529; 359/738, 739, 740, 717, 359/728
See application file for complete search history.

(56) References Cited

U.S. PATENT DOCUMENTS 7,688,531 B1    3/2010  Deng et al.
2010/0246030 A1*  9/2010  Chang et al. .................. 359/717

\* cited by examiner

*Primary Examiner* — Rochelle-Ann J Blackman
(74) *Attorney, Agent, or Firm* — Turocy & Watson, LLP

(57) ABSTRACT

Providing for a wafer level optical system employing composite lenses is disclosed herein. Conventional focus lens assemblies require three or more lenses. By way of example, two composite lenses can be used to reduce the cost of a wafer-level camera. In some aspects, the composite lenses can be aspheric and can employ a broader variety of wafer materials than earlier designs that only operated in narrow ranges of refractive indices and Abbe numbers.

40 Claims, 14 Drawing Sheets

WAFER LEVEL OPTICS

CLAIM OF PRIORITY UNDER 35 U.S.C. §119

The present application for patent claims priority to Provisional Patent Application Ser. No. 61/325,036 entitled "WAFER LEVEL OPTICS," filed Apr. 16, 2010, and hereby expressly incorporated by reference herein.

FIELD OF THE INVENTION

The following relates generally to imaging optics, and more specifically to a two-element composite lens architecture for a camera.

BACKGROUND

Cameras have become ubiquitous in recent years, finding applications from casual social settings to the most sophisticated medical technology. The integration of cameras with other devices such as cell phones and personal organizers has increased the function and utility of individual devices. The availability and flexibility of modern cameras allows their use in a diverse range of settings that are potentially unworkable for previous generations of cameras. However, combining image capture technology with other systems can cause an inconvenient increase in the size and weight of the composite device.

Accordingly, optics and electronics in general frequently benefit through reductions in component size. Today's cameras take up only a small fraction of the space required by previous generations as a result of developing technologies in digital imaging sensors and micro optics. The current generation of image sensors can provide high resolution image detectors utilizing micro-scale pixilation and high signal to noise ratio. However, reductions in size can result in increased cost and manufacturing complexity. Conventional fabrication procedures for optical lenses and related components, such as injection molding, glass fabrication and polishing, and so forth, are limited in production capacity and efficacy for micro-optics, such as those utilized for wafer level optics. Further, conventional optical fabrication can be prone to surface deformation or damage when exposed to the high temperatures associated with circuit formation for wafer level optics. Traditional heat curing processes can also increase manufacturing difficulties.

Therefore, to reduce the burdens associated with reduced system size without compromising image quality, it is desirable to develop small-scale camera systems that are easier to replicate, composed of fewer elements, have higher precision at millimeter and micrometer scales, and are simpler to install in various applications. The cost of optics is often determined predominantly by the cost of the lens assembly, and it thus follows that reductions to the cost of the lens or lenses can significantly mitigate unit expense.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the subject disclosure provides a wafer-level camera manufactured to reduce cost and complexity. In one embodiment, a plurality of composite lenses is utilized in an optical system. The composite lenses can be employed in lieu of a conventional lens assembly comprising separate lens elements. In an embodiment, a two-lens system can further provide for improved illumination efficiency at an image sensor of the wafer-level camera, as compared with a conventional lens assembly comprising three or more lens elements. This improved illumination can be derived, for instance, by minimizing Fresnel reflections in the optical system, while avoiding the increased costs of anti-reflective coatings, or other conventional mechanisms for reducing intensity of reflected light. In some aspects, the subject disclosure provides a wafer level optic design comprising two elements that provides comparable performance to conventional injection molded lens designs having a greater number of lens elements.

In one embodiment, a replication material is pressed. The replication material can be cured. In one embodiment, the replication material is cured using ultraviolet (UV) light. In some aspects, replication of the wafer-level camera can employ a reflow compatible design. In this way, a wafer-level optic can be bonded to a board concurrently with other circuitry (e.g., processor, memory). A plurality of lenses can be made in parallel using these and other techniques, providing speed and quantity advantages over previous slower manufacturing processes.

To the accomplishment of the foregoing and related ends, the one or more aspects comprise the features hereinafter fully described and particularly pointed out in the subject disclosure. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
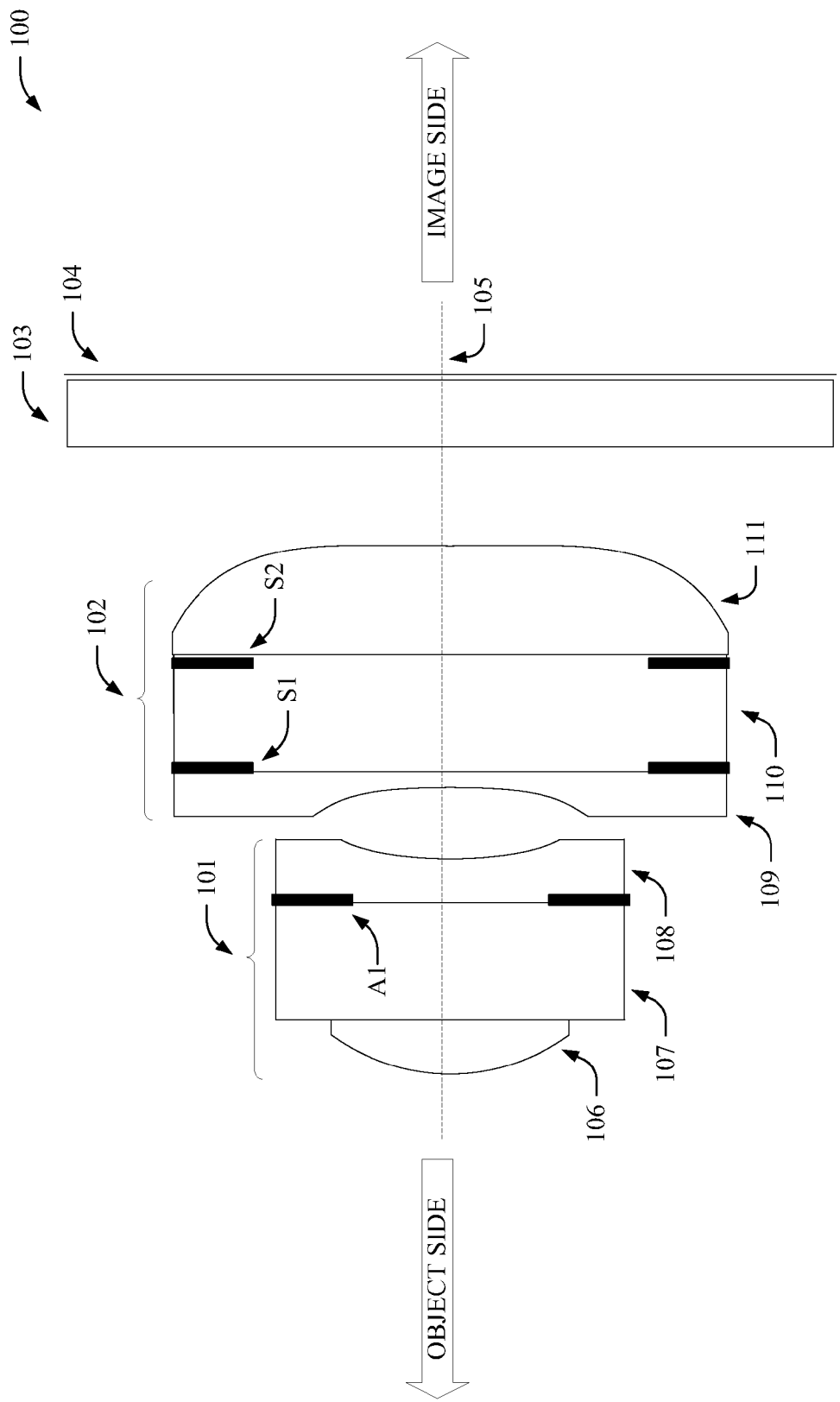
FIG. 1 depicts a block diagram of an example optical imaging system representative of various aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It will be evident however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that the specific structures or functions disclosed herein are merely representative. Based on the teachings herein one skilled in the art should appreciate that the disclosed aspects can be implemented independently of other aspects, and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the apparatuses and lens systems disclosed herein are described in the context of providing high resolution optical imaging via compact optical lens arrangements. One skilled in the art should appreciate that similar techniques could apply to a variety of optical lens architectures. For example, the lens arrangements used herein may be used in mechanical focus or auto-focus systems whereby the optical arrangement is automatically or manually displaced relative to the image plane.

Referring now to the drawings, FIG. 1 depicts a block diagram of an example optical system 100 according to aspects of the subject disclosure. System 100 comprises an arrangement of lens 101 and lens 102 positioned in a like manner relative to an optical axis 105. In one embodiment, system 100 has at least a double composite lens, and each of the at least two composite lenses include a plurality of elements. Lens 101 can be comprised of optical elements 106-108, and lens 102 can be comprised of optical elements 109-111. System 100 further includes cover glass 103 and sensor 104. In the depicted embodiment, the total axial length can be 4.18402 millimeters. While this arrangement is typical for at least one embodiment, it should be appreciated that other possible arrangements and structures can exist consistent with the aspects described herein.

With respect to the optical systems described herein, a lens can be comprised of (but is not limited to) an element spaced so far from any adjacent lens element that the spacing cannot be neglected in computing the image forming properties of the respective lens elements, or two or more elements that have adjacent lens surfaces either in full overall contact or so close together that any spacing between the adjacent lens surfaces are so small that the spacing(s) can be neglected in computing image forming properties of the two or more lens elements. In addition, it should be appreciated that an optical component can refer to (but is not limited to) a superset of items having significant properties related to imaging optical systems, and includes lens components, as well as optical stops, but can also include various other items such as a thin film, a bandpass filter, a lowpass or highpass filter such as an IR filter, a polarizing filter, a mirror, et cetera. Lens elements can be combined in a variety of ways, including adhesives, chemical bonding, mechanical fixtures, and others. In one or more embodiments, different lens elements can be in direct contact, or separated by a material (e.g., optical interface fluid, glass, other optical substrate) of substantially uniform refractivity.

Sensor 104 can be a digital device comprising a multi-dimensional array (e.g., a two dimensional array) of electro-optical sensors, or pixels. Examples of such a device can include a charge-coupled device (CCD) array, or a complementary metal-oxide semiconductor (CMOS) array, or the like. Each electro-optical sensor, or pixel, of such array is configured to output an electric signal when irradiated with light. Furthermore, an amount of electric current for the electric signal is directly related to energy density of light irradiating the pixel. Accordingly, by collecting output current levels from each pixel of the array, sensor 104 can digitally reproduce a two dimensional radiant energy pattern of light irradiating the sensor 104. Additionally, where the pixel surface of sensor 104 is placed at an image distance, the two dimensional radiant energy pattern that is produced is that of a real optical image generated by optical elements 106-111. Accordingly, sensor 104 can be utilized to digitally reproduce that image.

Resolution of a digital image generated by sensor 104 depends on a number of pixels of a pixel array of sensor 104, which in turn is dependent on pixel area and total array area. Thus, for example, for relatively square pixels approximately 1.75 microns per side (3.06 square microns), a 3 megapixel (3 Mp) sensor can have a diagonal dimension of about 4.48 millimeters, and an image circle of approximately 4.6 millimeters. In an embodiment, sensor 104 can have an aspect ratio of 4:3. It is to be appreciated, however, that a variety of sensor specifications can be used, and similar resolutions or dimensions can be realized using an image sensor of alternative design. Because the pixel array generates an electronic reproduction of a real image, data generated by sensor 104 in the form of electric signals can be saved to memory, projected to a display for viewing (e.g., digital display screen), edited in software, and so on. Thus, at least one application of optical system 100 is in conjunction with a digital camera or video camera comprising a digital display (not depicted). Furthermore, optical system 100 and other optical systems included in the subject disclosure can be implemented in conjunction with a camera module of an electronic device. Such an electronic device can include a wide array of consumer, commercial or industrial devices. Examples include consumer electronics, including a cell phone, smart phone, laptop computer, net-book, PDA, computer monitor, television, flat-screen television, gaming systems and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, et cetera), or industrial surveillance equipment (e.g., airfield cameras, freight yard cameras, rail yard camera, and so on). For instance in consumer electronics, because optical elements 106-111 can comprise elements having fixed positions relative other elements, and having either static or dynamic position along the optical axis 105, system 100 and other disclosed systems are well suited for various types of mini or micro camera modules. It is to be appreciated, however, that the disclosed systems are not limited to this or any other particular applications described herein or elsewhere; rather, other applications known to those of skill in the art or made known by way of the context provided herein, are included within the scope of the subject disclosure.

Generally, an optical element can be a single piece of refractive or reflective material at least partially transparent to electromagnetic radiation at least within the visible spectrum (e.g., approximately 400 to 700 nanometers). Examples of suitable material include ground and polished glass, molded glass or replication molding process, wafer level optics (WLO), injection-molded plastic, etched micro optics, or the like. Additionally, an optical element will have at least one refractive or reflective surface. One example of an optical element utilized herein is an optical lens. An optical lens is an optical element comprising two opposing refractive surfaces, and an edge between the opposing surfaces that defines an outer diameter (for a circular lens) or a rectilinear perimeter (for WLO) of the lens. In an embodiment, composite lenses include lens 101 and lens 102. In the depicted embodiment, the composite lenses can be a single, transparent mass of refractive material with two opposing refractive surfaces. The refractive surfaces can have different refractive indices and can be made from different dispersive materials or media. The two refractive surfaces can be separated by a glass plate or other material including appropriate optical surfaces.

In at least one aspect of the subject disclosure, a composite lens can be produced with a wafer level camera replication process. For example, a wafer level camera lens can be produced on a wafer made of a suitable refractive material (e.g., a plastic, a glass, etc.). Examples of typical refractive materials employed for wafer level camera lenses can include D263, AF32, AF45, and so on. One limitation of lenses made from these typical waver level refractive materials is the relatively narrow range of refractive index of such materials (e.g., about 1.48 to about 1.52), and the typical Abbe number of about 55 for such materials. This relatively narrow range of refractive index and Abbe number of typical wafer level optic materials tends to reduce control over, or degrees of design freedom for, various features of an optical system, such as focal length, power, magnification, error correction, etc. In at least one aspect of the subject disclosure, wafer substrates employed for wafer level composite lenses can comprise a wide range of refractive materials, instead of the typically narrow range of such refractive materials employed for wafer level optics, as is discussed in more detail below.

In one embodiment, the composite lenses can be formed by joining two surfaces of two separate optical elements (e.g., optical lens, optical plate, refractive medium, etc.). The two surfaces can be adhered to one another with an optical epoxy, optical cement, or the like. The optical epoxy or optical cement can be configured to minimize or avoid air trapped between the two surfaces, providing a medium between the two surfaces having substantially uniform refractive index. In an embodiment, the substantially uniform refractive index can be selected so as to provide a transition from a first refractive index of a first of the two separate optical lenses, to a second refractive index of a second of the two separate optical lenses. It should be appreciated that a composite lens can comprise more than two optical elements. For instance, an optical lens can be adhered to a first surface of an optical element (e.g., a refractive plate), and a second optical lens can be adhered to a second surface of the optical element to form a composite lens. Alternative, or in addition, further optical elements can be adhered to the optical lens or to the second optical lens, or to surfaces of these further optical elements, and so on.

In an alternative or additional embodiment, the optical epoxy or optical cement can be selected so as to provide a variable refractive index that changes spatially over a given distance (e.g., a distance separating the two separate optical lenses, which could be several or more nanometers, several or more micrometers, several or more millimeters, and so forth). This variable refractive index can be similar to a refractive index of the first of the two separate optical lenses spatially proximate the first of the two separate optical lenses, and transition to another refractive index similar to a refractive index of the second of the two separate optical lenses spatially proximate the second of the two separate optical lenses. It is to be understood that a composite lens, as defined herein, is not limited to a specific number of lens elements, or a particular manner of manufacturing, except where specifically noted or required by related context. Rather, other aspects known in the art, or made known to one of skill in the art by way of the context provided herein are considered within the scope of the subject disclosure.

In one embodiment, lens 101 and lens 102 comprise an imaging lens and are at least generally transverse to an axis such as optical axis 105. The imaging lens can include an aperture stop. In an embodiment, an aperture stop A1 can be located on a glass surface on the image side of lens 101. In one embodiment, the aperture stop A1 can be located between optical elements 106 and 107 (not depicted). In an alternative embodiment, the aperture stop can be located between optical elements 107 and 108. The imaging lens can further include one or more field stops to reduce or eliminate stray light. In one embodiment, one or more field stops can be located on lens 102 (e.g., a glass plate 110 of lens 102 can have one field stop at an object side of glass plate 110, and a second field stop at an image side of glass plate 110). Thus, in one embodiment, lens 102 can comprise a field stop S1 at an intersection of optical element 109 and optical element 110. In one embodiment, lens 102 can comprise a field stop S2 at an intersection of optical element 110 and optical element 111. Lens 101 and lens 102 can have a plurality of surfaces. The plurality of surfaces can have different radii of curvature, media and refractive indices, but do not always necessarily have different characteristics unless otherwise noted.

The composite lenses including at least lens 101 and lens 102 can be produced using a replication process or processes used to manufacture wafer level camera lenses. Conventional wafer level camera lenses are typically produced on wafers made of a relatively narrow set of wafer materials, as compared with materials employed in non-wafer level optics. Examples of such materials might include materials having glass catalogue numbers such as D263, AF32, and AF45, for instance. This relatively narrow range of wafer materials, however, tends to constrain the range of optical design properties, such as refractive index and Abbe number, within a relatively narrow range for wafer level optics. For example, refractive indices for typical wafer level optics can often be limited to a range from 1.48-1.52, whereas Abbe number for typical wafer level optical substrates might often be limited to a narrow range within 55. This can significantly reduce the flexibility and range of control over important optical design characteristics for conventional wafer level optics, such as focal length, optical power and magnification, illumination efficacy, error correction, and so on.

In at least one aspect of the subject disclosure, the foregoing problem can be addressed at least in part by employing a wide range of refractive materials for wafer level optical devices. As a result, lens designs according to composite lenses of this aspect(s) of the subject disclosure become more flexible, enabling higher optical performance. More particularly, the composite lenses comprising lens 101 or lens 102, or both, can employ a broader assortment of wafer materials than used for conventional wafer level optics. In an example, wafer level components (e.g., 106, 107, 108, 109, 110, 111, etc.) of lenses 101 or 102 can be selected from a wide range of glass types, having a relatively wide range of refractive indices and Abbe number. In an embodiment, the glass types employed for components of lenses 101 or 102 can have corresponding refractive indices that range from substantially 1.45 to substantially 2, or have corresponding Abbe number ranging between substantially 23 and substantially 85. The resulting flexibility allows the design to achieve a high level of optical performance with relatively few lenses (e.g., lenses 101 and 102).

In an embodiment, the replication process used to manufacture lenses 101 and 102 includes one or more curing processes on glass plates to produce the radii of curvature for the respective surfaces in at least one composite lens. The curing process can form at least predetermined, substantially complementary surfaces in or on refractive surfaces and/or the glass separator. In some aspects, the curing process can employ UV light. Some techniques can also employ heat curing or injection molding. In some aspects, epoxides and oxetanes can be cured using at least UV and thermal curing. In some aspects, acrylates and methacrylates can be cured using at least UV and thermal curing. In some aspects, maleate esters can be cured using at least UV and thermal curing. In some aspects, thiol/ene can be cured using at least UV and thermal curing. In some aspects, vinyl ether can be cured using at least UV and thermal curing. In some aspects, perfluorocyclobutyl can be cured using at least thermal curing, or be injection molded. In at least one embodiment, the surfaces of a glass plate can be parallel, concave or convex near optical axis 105. As depicted in system 100, the surfaces between optical elements 106-108 and 109-111 can be parallel with respect to the other elements in the respective lens. However, those skilled in the art can appreciate other possible configurations in accordance with the disclosure herein.

In a particular embodiment, lens 101 can have a positive refractive power and a convex surface on its object side being made of polymer. A first predetermined polymer configuration can be bonded to a first glass plate having a predefined optical surface facing the optical surface of the image side of the first polymer configuration and being substantially complimentary. In addition, a second polymer configuration can be provided, and can have a concave surface on the image side near the optical axis which is bonded to the image side of the first glass plate having a predefined optical surface facing the optical surface of the object side of the second polymer configuration and being substantially complementary. Further, lens 102 can have a concave surface on the object side near the optical axis, being made of polymer. A third predetermined polymer configuration can be bonded to a second glass plate having a predefined optical surface facing the optical surface of the image side of the third polymer configuration and being substantially complimentary. Finally, a fourth polymer configuration can have a concave surface on the image side near the optical access which is bonded to the image side of the second glass plate, having a predefined optical surface facing the optical surface of the object image side of the fourth polymer configuration being substantially complementary. In the instant embodiment, lens 101 and lens 102 each have at least one aspheric surface. In another embodiment, the object side surface of optical element 106, image side surface of optical element 108, object side surface of optical element 109, and image side surface of optical element 111, are aspheric surfaces (e.g., as defined by a conventional even polynomial asphere equation, an odd polynomial asphere equation, or the like). A ratio of a total track length of the system to an image circle diameter can be less than 0.89, in one or more embodiments. Details of this embodiment or derivatives thereof are not considered exclusive or exhaustive, and other arrangements or combinations will be apparent to those skilled in the art.

Other examples of other extensions of the above embodiment are also possible. The surface of the first glass plate can be parallel, the surfaces of the second glass plate can be parallel, and the surface of a substrate glass plate can be parallel. The opposing surfaces of lens 101 and lens 102 can be aspheric, and lens 102 can have a negative refractive power. The first, second and substrate glass plates can be made of material sharing the same refractive index. In addition, the refractive index of the image and the object side surfaces of the lens 101 can equal that of the object side surface of lens 102. Further still, lens 101 can be made of material sharing the refractive index of the object side surface that is lower than the refractive index of the image side.

In an embodiment alternative to some (but not necessarily all) of these aspects, or additional to one or more such aspects, the imaging lens comprising at least composite lens 101 and composite lens 102 can be characterized by an F-number of about 2.74, and a through focus modulation transfer function thereof can indicate a contrast level of at least approximately 0.15 at a spatial frequency approximately one-half the Nyquist frequency of the sensor 104 for a given object distance associated with an image distance from the lens system. In the embodiment above, the modulation transfer function can vary with the image distance such that the function is at maximum value greater than 0.44 at a selected first image distance larger than 1000 millimeters and decreases from the maximum function to a lower value that is greater than 0.15 corresponding to an object distance of about 500 millimeters. In another alternative (but not exclusively alternative) embodiment, the refractive index of the first, second and substrate glass can range from 1.5 to 1.6. In still another non-exclusive embodiment, the Abbe number of the first, second and substrate glass can range from 30 to 60. Still further, the relation of the chromatic focal shift of the imaging lens can be about 89 micrometers. Moreover, the relation of lateral color of the imaging lens can be about 0.4 micrometer.

In a particular aspect of the subject disclosure, lens 101 has a positive refractive power. Further, the object side surface of optical element 106 can be convex, and the image side surface of optical element 108 can be concave. Lens 102 can have a positive or negative refractive power, and the object side surface of optical element 109 can be concave. The image side surface of optical element 109 can be concave near optical axis 105. In at least one embodiment, the image side surface of optical element 111 can have varying power which is positive at its vertex and increasingly negative with radial distance from the vertex. In an embodiment, the object side surfaces of optical elements 106 and 109, as well as the image side surface of optical element 111, are all made of a dispersive material smaller than the image side surface of optical element 108. According to one or more embodiments conforming to the surface shapes and dispersion relations above, field correction and chromatic aberration correction can be easily implemented.

The opposing surfaces of lens 101 and lens 102 can be aspheric. According to the depicted embodiment, the imaging lens can also satisfy a series of other conditions described hereafter. The refractive indices of optical elements 106, 109 and 111 can be equal. The refractive index of optical element 110 can be greater than the refractive index of optical element 106. In an embodiment, the refractive indices of optical elements 106, 109 and 111 can range between substantially 1.45 and substantially 1.6, and the refractive index of optical element 110 can range between substantially 1.55 and substantially 1.65. In one embodiment, the Abbe numbers of the first and second glass plates can be from substantially 50 to substantially 60. The Abbe numbers of the media used in optical elements 106, 110 and 111 can range from between substantially 50 and substantially 60. The Abbe number of optical element 108 can be between substantially 30 and substantially 40. In an embodiment, the total track length can be substantially 4.2 millimeters. For the cover glass listed in Table 1, the total track length divided by the image size can be substantially 0.89. Additionally, a focal length, $f_1$, of the lens 102 constituted between the object side surface of optical element 106 and the image side surface of optical element 108. A second focal length, f, can be a combined focal length of optical system 100, and in at least one disclosed aspect the second focal length can be substantially equal to 3.82. Moreover, in at least one specific embodiment, optical system 100 can satisfy a focal length constraint whereby the first focal length $f_1$ divided by the second focal length f is less than substantially 0.848. By satisfying this constraint, an embodiment can perform field correction and chromatic aberration correction in a simpler fashion.

Optical elements 107 and 110 can be of equal thickness on optical axis 105, and the on-axis spacing between optical element 111 and sensor 103 can be less than the thickness of optical elements 107 and 110. Further, the on-axis spacing between optical elements 108 and 109 can be less than the on-axis spacing between optical element 111 and sensor 103.

The tables included infra provide further details on the depicted embodiment of system 100 and others. Prescriptions that can define lens 101 and lens 102 are provided in Table 1. Lens 101 and 101 can be aspheric, and surface data for at least one embodiment is described below in Table 2. Table 3 provides details relating to aspheric coefficients of the known even aspheric equation used for even aspheric lens surfaces (e.g., surfaces 2, 4, 6, et cetera, can be analyzed including by way of software such as ZEMAX). Table 4 includes index of refraction data for the surfaces of optical elements 106-111.

Figure 2:
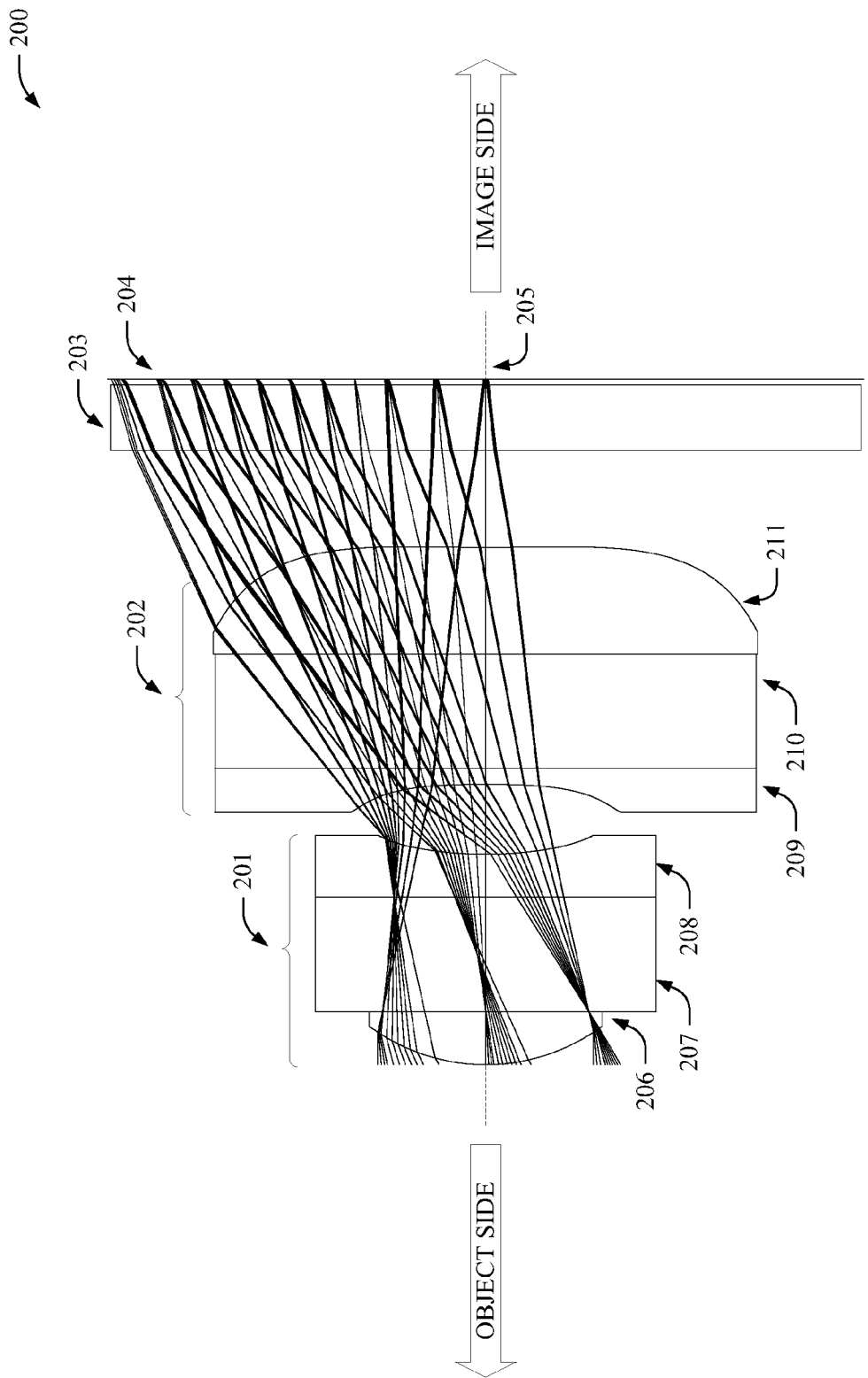
FIG. 2 illustrates a block diagram of an example optical imaging system representative of various aspects of the subject disclosure.

FIG. 2 shows at least one embodiment of a dual composite lens imaging system including rays travelling through the system. Light entering the left side, or object side, of lens 201 can interact sequentially with respective optical elements 206-211 and exit the right side, or image side, of lens 202, toward a sensor 203. It should be appreciated that not all light interacting with the left side of the optical elements 206-211 will be transmitted to the sensor 203; some light can be reflected off of respective elements, some light can be scattered away from the optical axis 205 and absorbed (e.g., by an optical stop), and so forth. However, in general, the optical elements 206-211 will receive light from an object on one side of the elements (e.g., the left side) and form a real image of the object on an opposite side of the elements (e.g., on the right side). The real image will be formed along the optical axis 205 a certain distance from the optical elements 206-211, an image distance. Notably, the image distance depends primarily on a corresponding object distance (the distance between the object and the optical elements 206-211 along the optical axis 205) and a refractive power, or optical power, of the combined optical elements 206-211.

Figure 3:
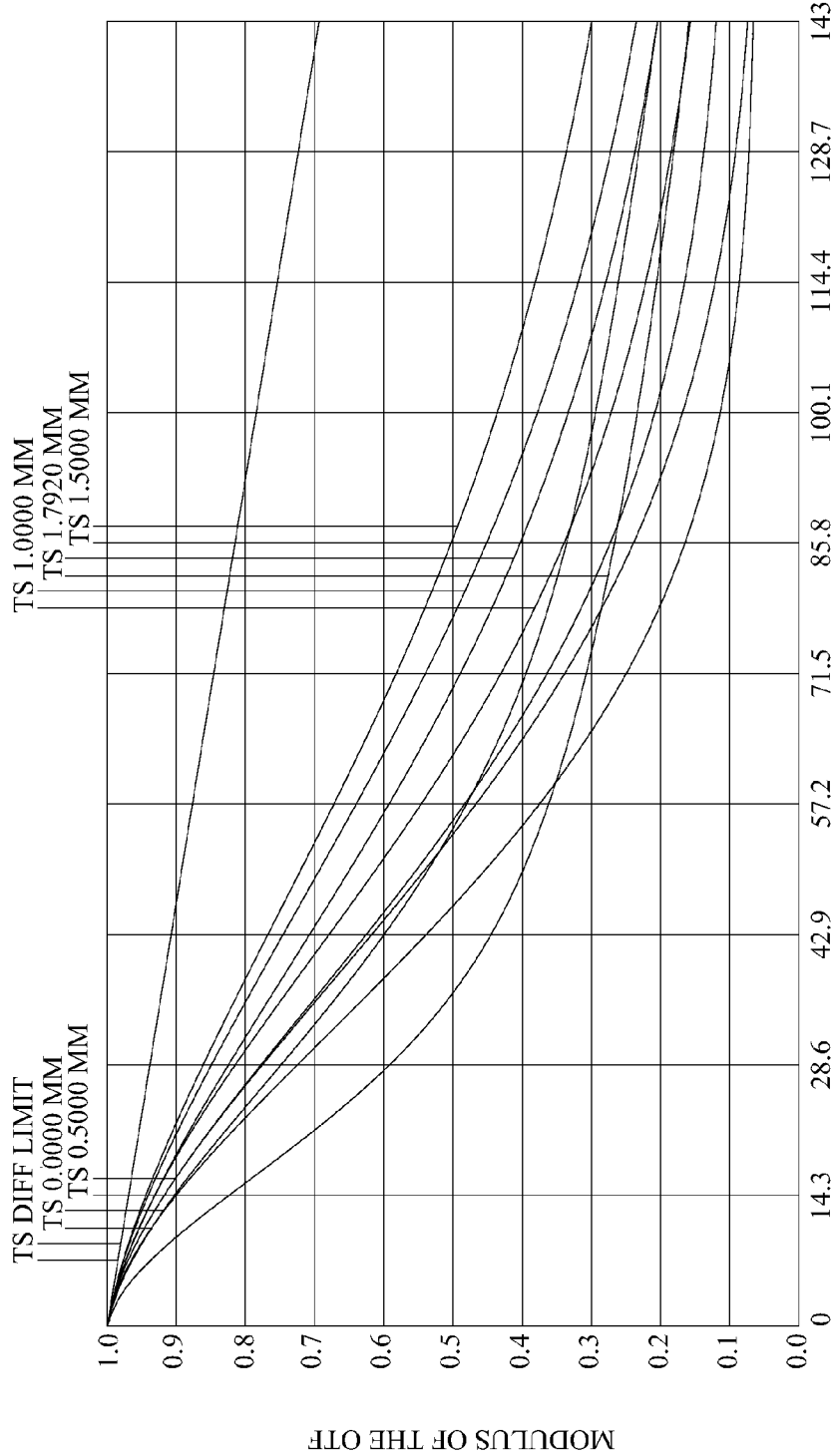
FIG. 3 depicts a modulation transfer function (MTF) response for the fixed focus optical system for an object distance (OD) of 500 millimeters (mm).
Figure 4:
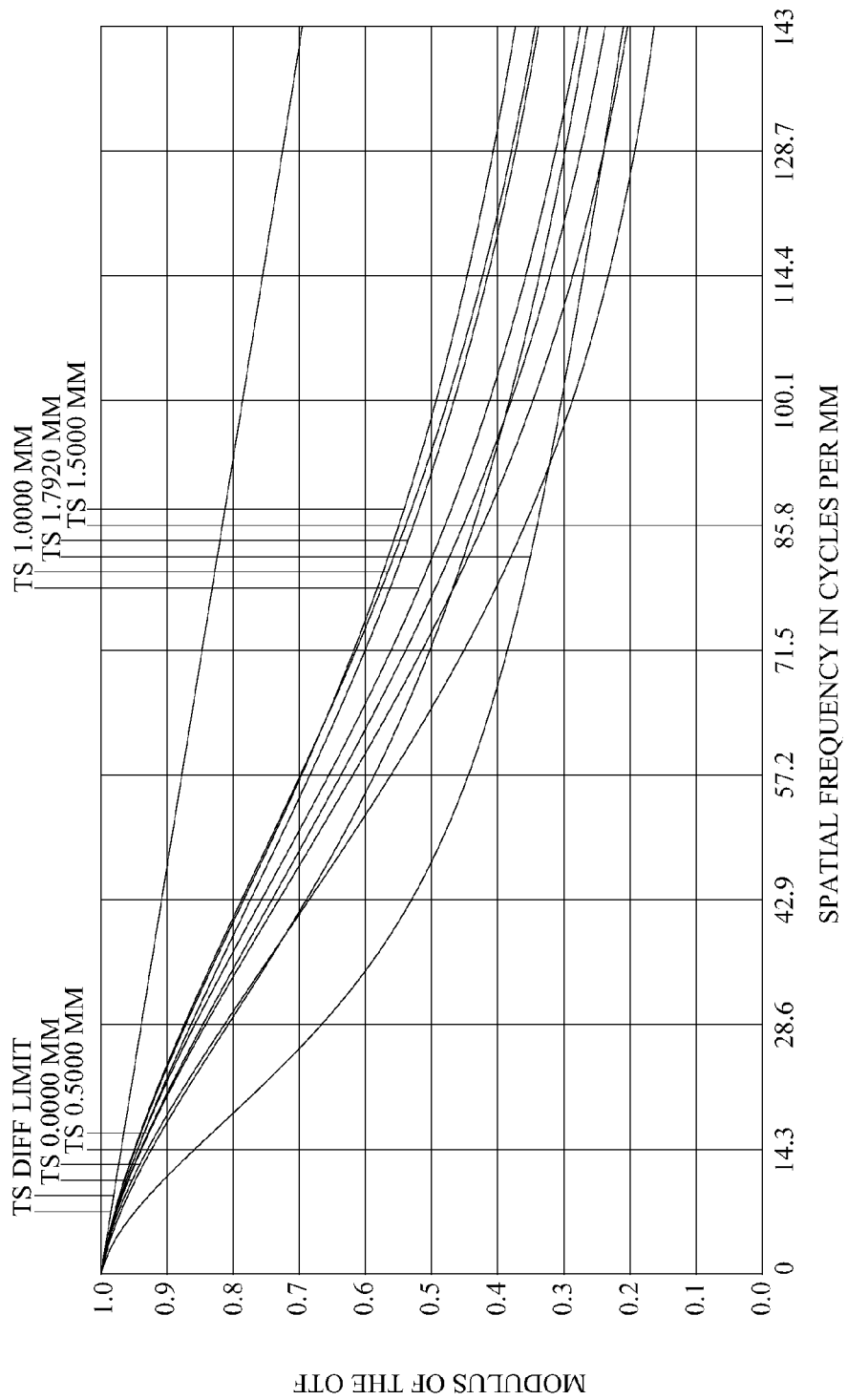
FIG. 4 illustrates a modulation transfer function (MTF) response for the fixed focus optical system for an object distance (OD) of 1000 millimeters (mm).
Figure 5:
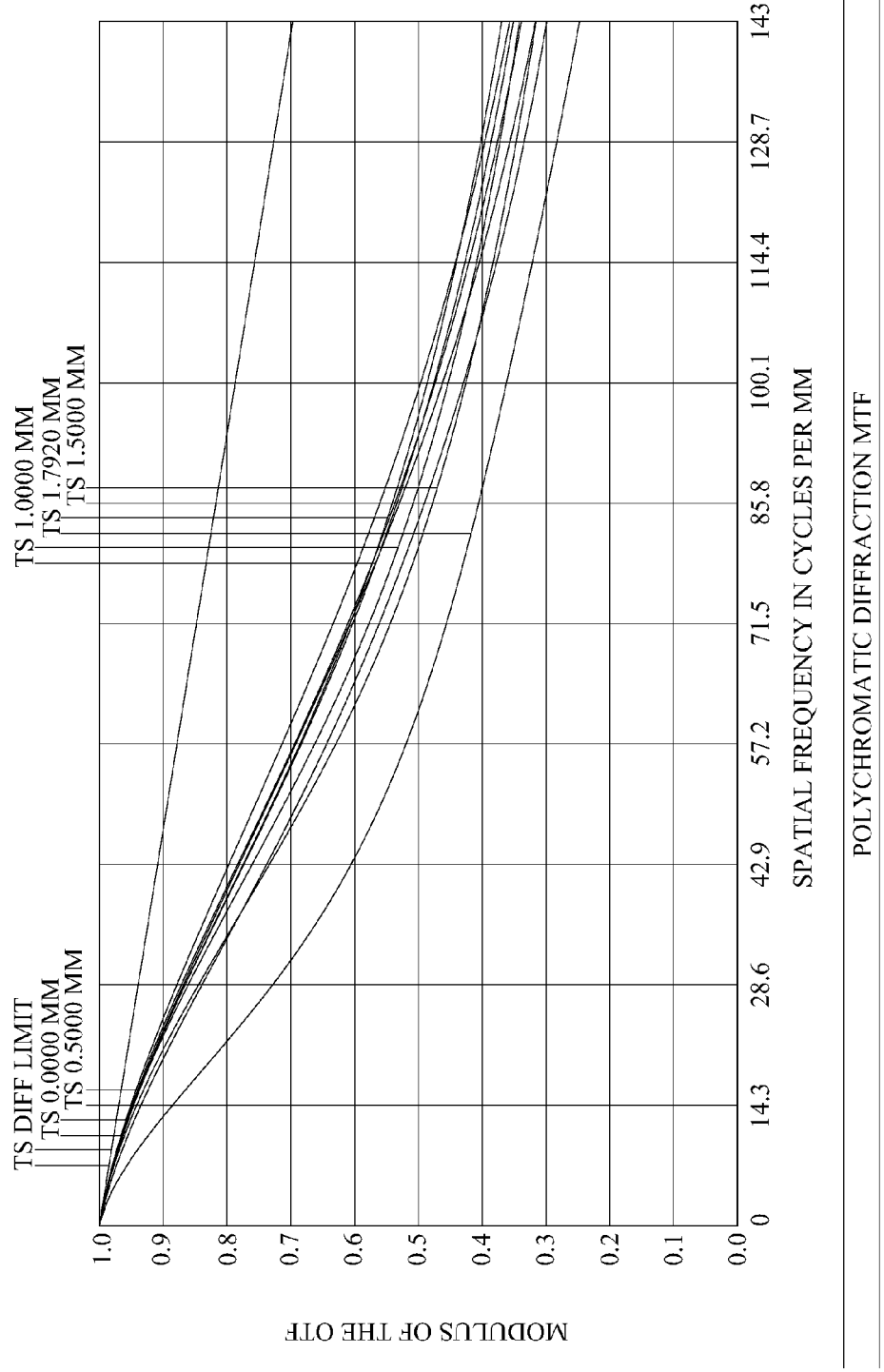
FIG. 5 depicts a modulation transfer function (MTF) response for the fixed focus optical system for an object distance (OD) of infinity.

FIG. 3, FIG. 4 and FIG. 5 display a calculated MTF curves for at least one embodiment of a dual composite lens imaging lens design for object distances of 500 millimeters, 1000 millimeters, and far distance (e.g., "infinity"), respectively. In FIG. 3, FIG. 4 and FIG. 5, each text label accompanying a pointer is associated with two curves. The calculated MTF curves are shown at different light wavelengths. Specifically, FIG. 3 illustrates polychromatic diffraction MTF for an object at 500 millimeters objective distance. For an object distance of 1000 millimeters, FIG. 4 shows that the polychromatic diffraction MTF decays more slowly than in FIG. 3. FIG. 5 similarly displays a polychromatic diffraction MFT for OD at a far distance.

Figure 6:
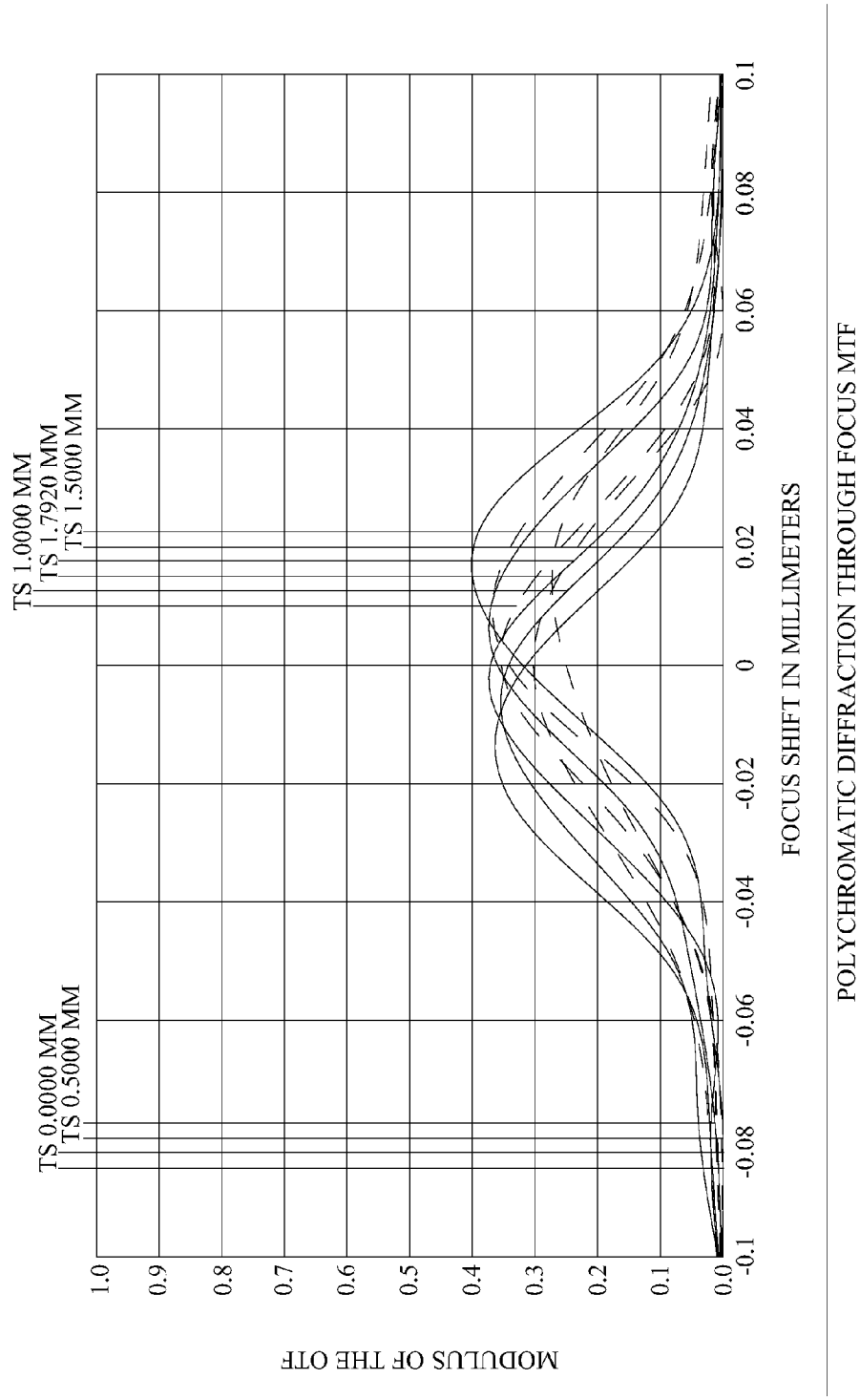
FIG. 6 illustrates a through focus MTF (TF-MTF) response for positive and negative focal shifts for the optical system according to other aspects.

FIG. 6 illustrates an example of a graph representing a calculated through-focus MTF at a specified spatial frequency against defocus distance. Like some of the earlier figures, FIG. 6 also shows a single label per two curves. In the depicted embodiment, the spatial frequency can be 143 cycles per millimeter. A minimum acceptable image quality is often considered to be within a delimited range of defocus distance over which the MTF is greater than or equal to about 0.15. A focus shift of about −0.02 to about −0.04 can correspond to an MTF greater than about 0.15 for a range of object distances and corresponding image distances. In one instance, a focus shift of about −0.028 mm can correspond to an object at a distance of 500 millimeters. A focus shift of 0.011 mm can correspond to an object at a distance of 1000 millimeter. Finally, a focus shift of 0.0 millimeters corresponds to an object at a far distance (e.g., "infinity"). As depicted, the defocus distances of about −0.028 to about 0.0 millimeters is the depth of field over which the range of defocus distances provides sufficient contrast for resolving an image.

Figure 7:
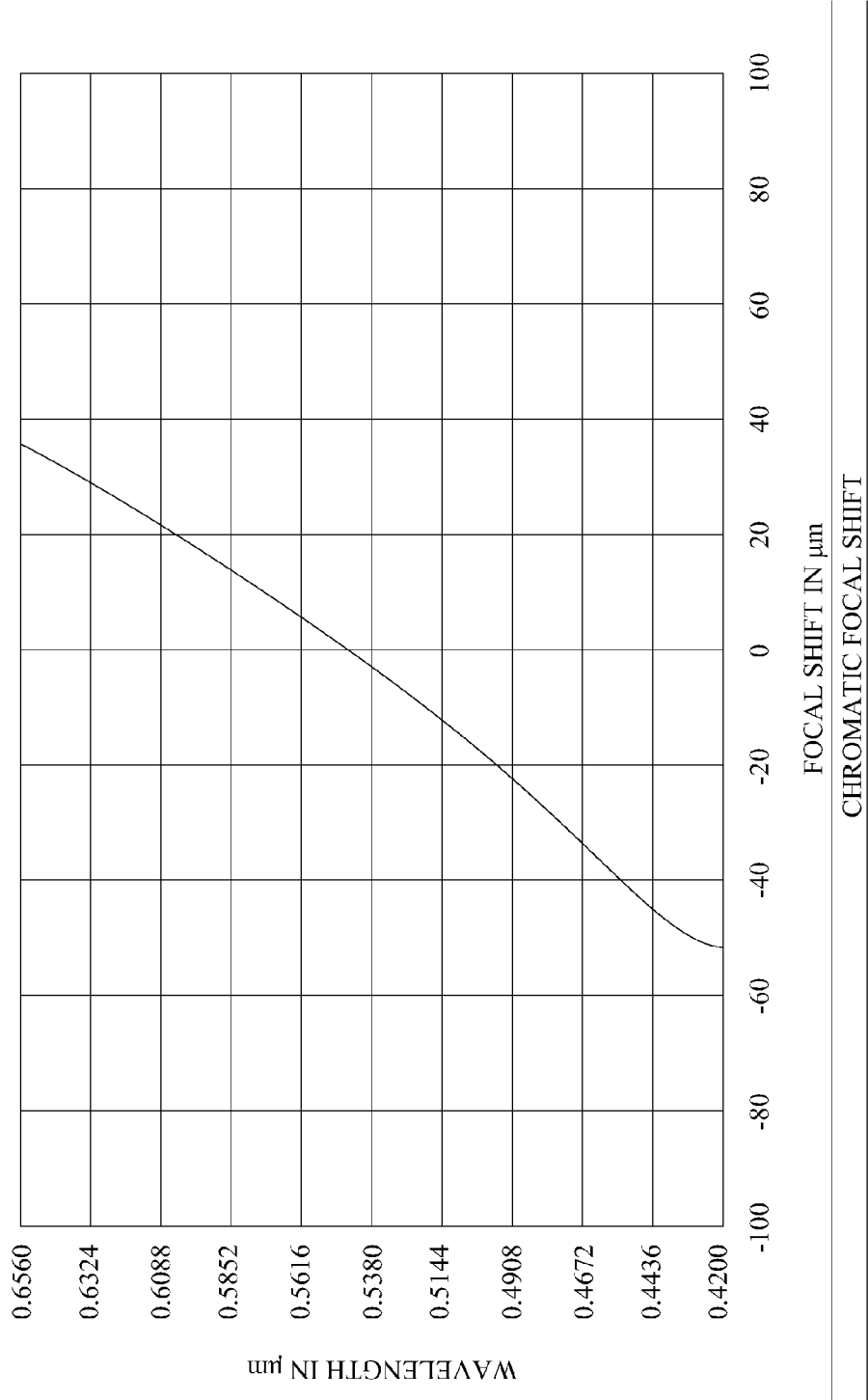
FIG. 7 depicts a graph of chromatic focal shift for the optical system based on additional aspects.

FIG. 7 displays an embodiment of chromatic focal shift of an imaging lens. In an embodiment, the chromatic focal shift is approximately 89 μm (micrometers) over the given range of wavelengths. In the depicted embodiment, the diffraction limited range is roughly 19 μm.

Figure 8:
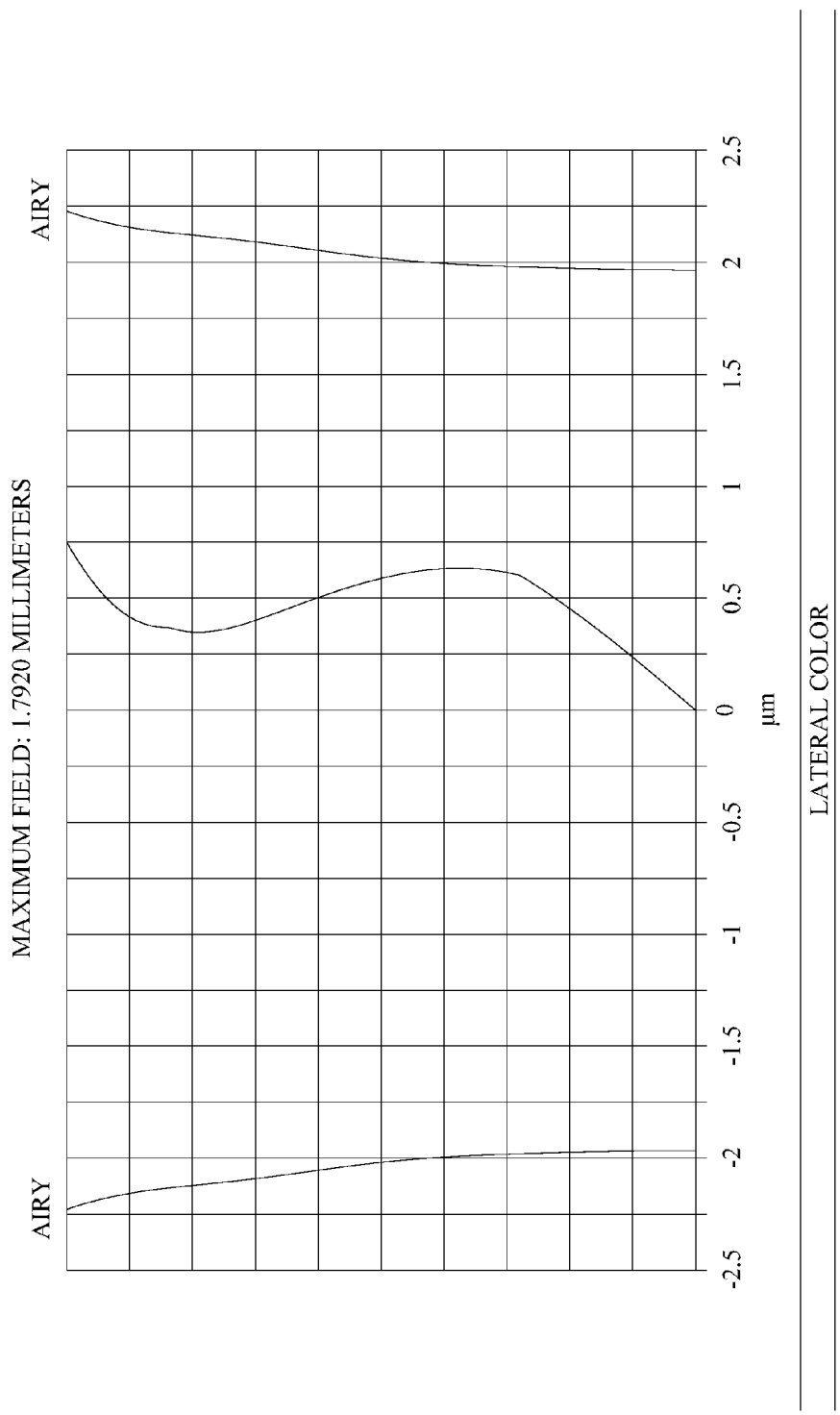

FIG. 8 illustrates an example of a graph representing lateral color error. In the illustrated embodiment, the maximum field can be 1.7920 mm. In an embodiment, the lateral color error of the imaging lens is about 0.4 micrometers. The short wavelength can be 0.4200 μm, and the long wavelength can be 0.6560 μm.

Figure 9:
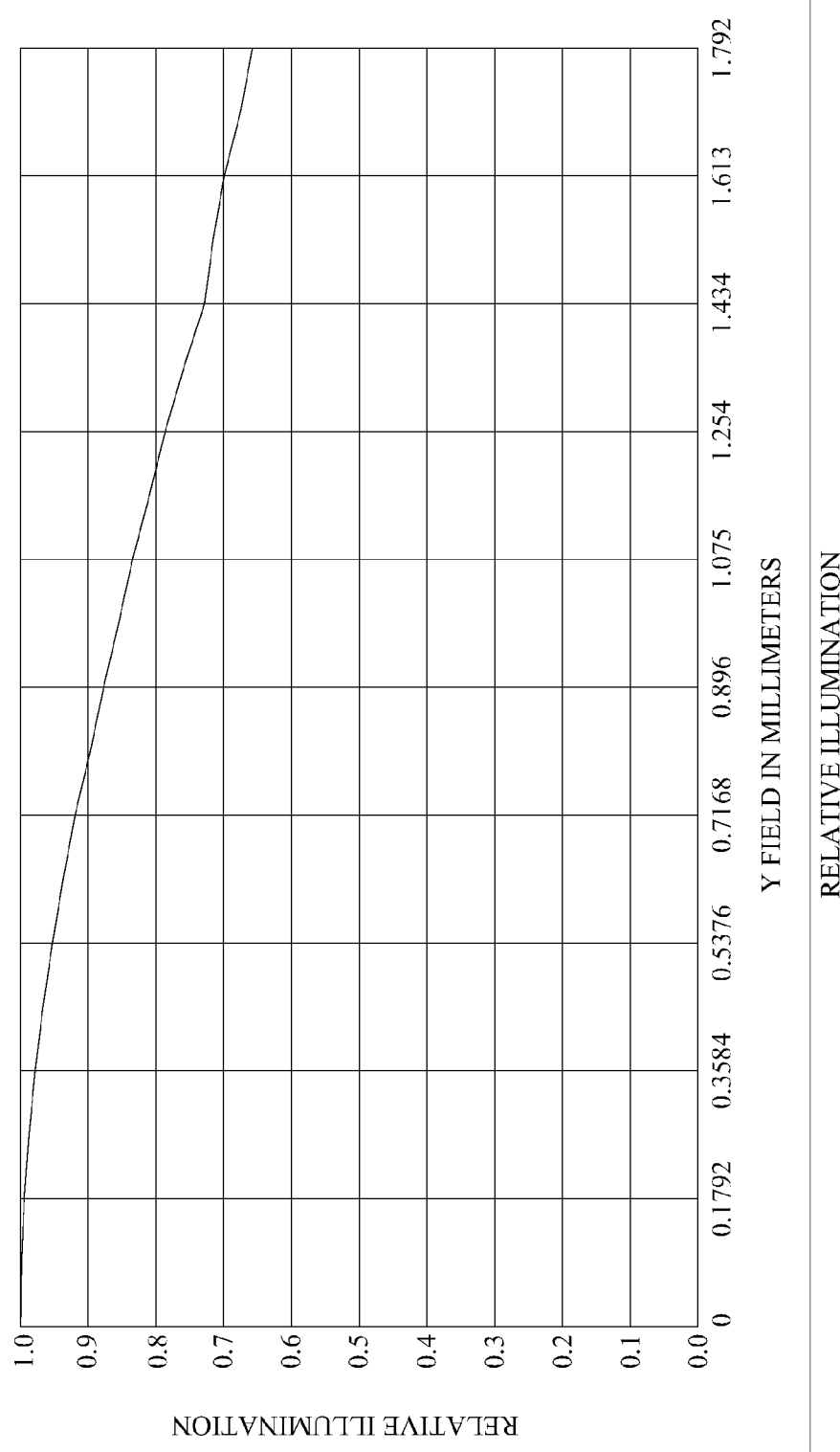
FIG. 9 illustrates a graph of relative illumination for the optical system indicative of sensor exposure for the system.

FIG. 9 shows a graph depicting relative illumination with a wavelength of 0.546000 μm.

Figure 10:
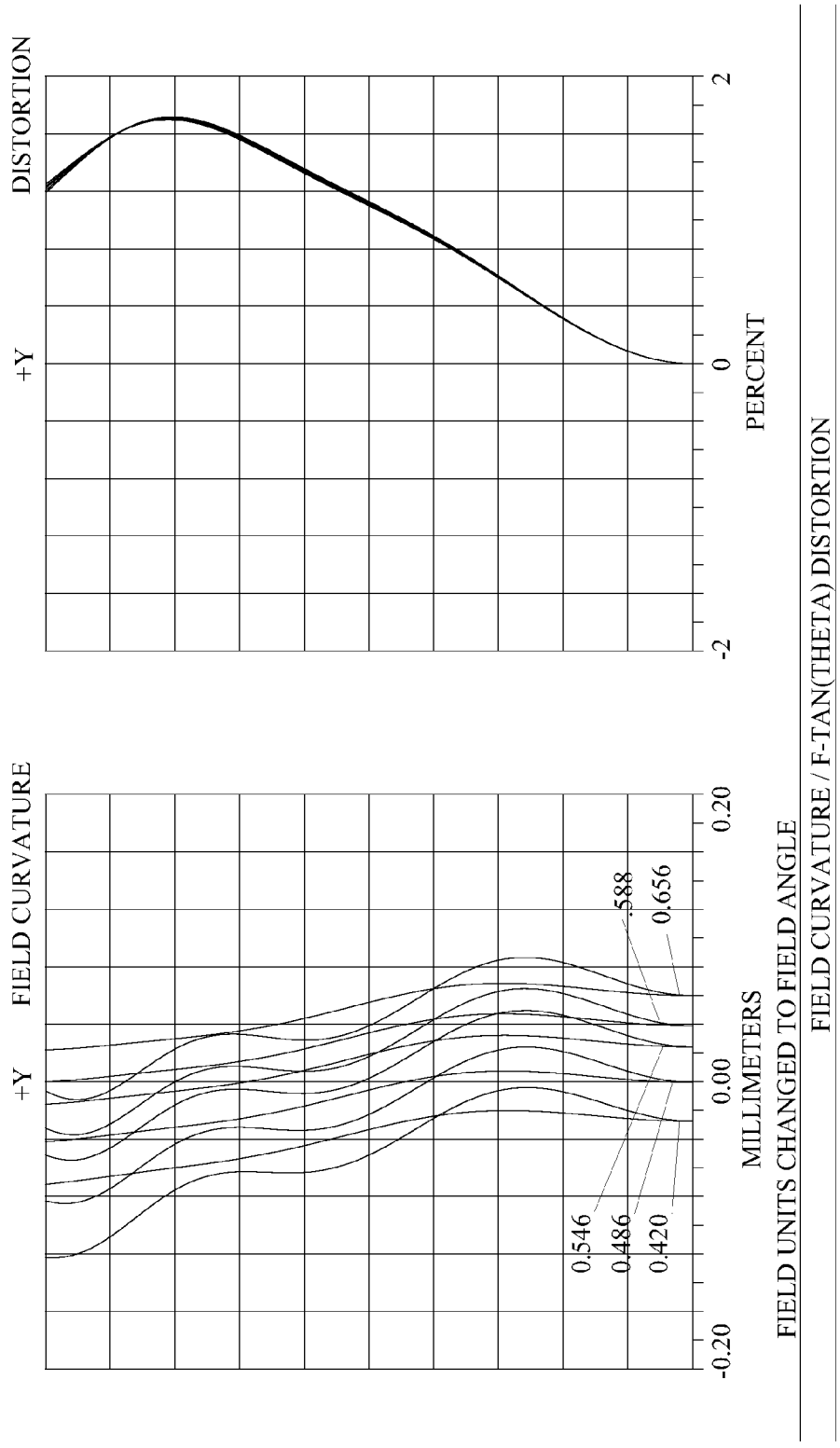
FIG. 10 depicts a graph of field curvature and distortion for the optical system for a range of depicted wavelengths.

FIG. 10 illustrates field curvature and distortion. In FIG. 10, wavelengths are labeled in the plot of field curvature, and one label is applied to two curves. In an embodiment, the maximum field can be 25.033 degrees.

Figure 11:
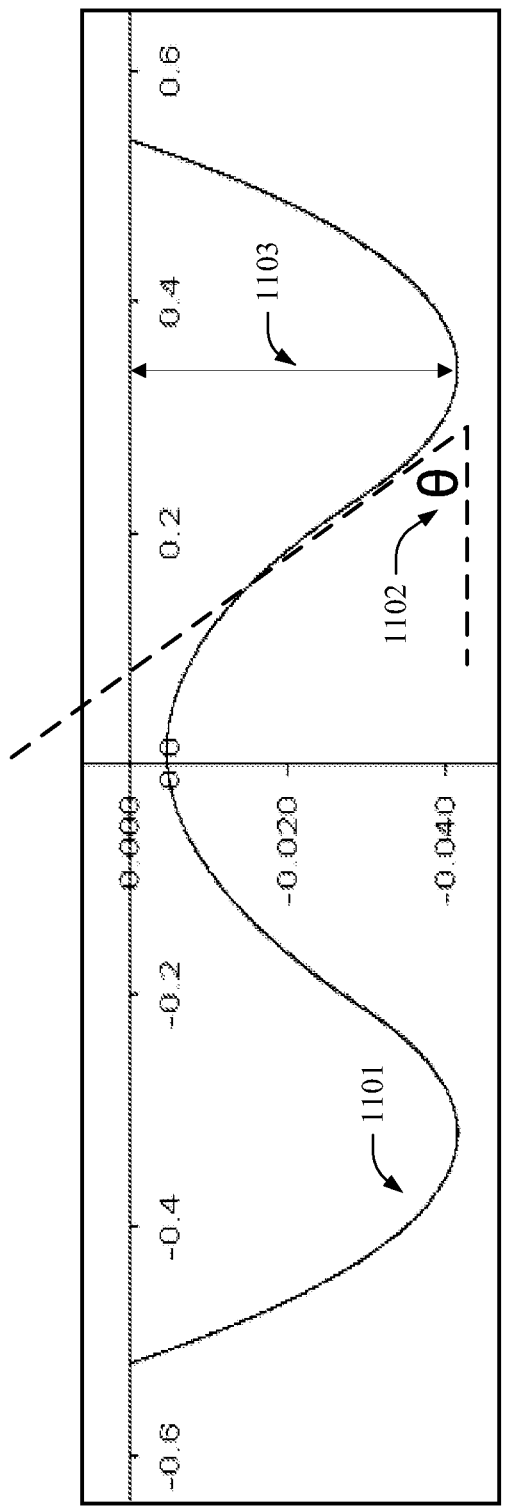
FIG. 11 illustrates one embodiment of dimensions for aspects of a wafer level optic including a high-field convex curve.

FIG. 11 displays an example high field convex stamping master for fabricating wafer level optics from replication materials, according to various disclosed aspects. According to some embodiments, the high field convex stamping master can provide precision optical dimensions that are difficult or impossible to achieve with other fabrication techniques, such as injection molding, or the like. In some embodiments, minimum blend zone radius 1101 can be at least 105% of a tool radius used for work on the element. In some embodiments, the tool can be composed at least in part of diamond. Slope 1102 (Θ) can be the maximum lens slope. In one embodiment, a slope up to 70 degrees can be machined. Sag 1103 can represent the maximum sag. Sag 1103 can be a function of at least the clear aperture and blend, but can be influenced by other factors as well. In one aspect disclosed herein, the maximum sag can be up to about 600 microns, and in another aspect up to about 660 microns. In one embodiment, the blend can be the change in slope to facilitate transitions between adjacent lenses or substrates. The blend can be kept near-parallel in one embodiment to improve replication and machining.

Figure 12:
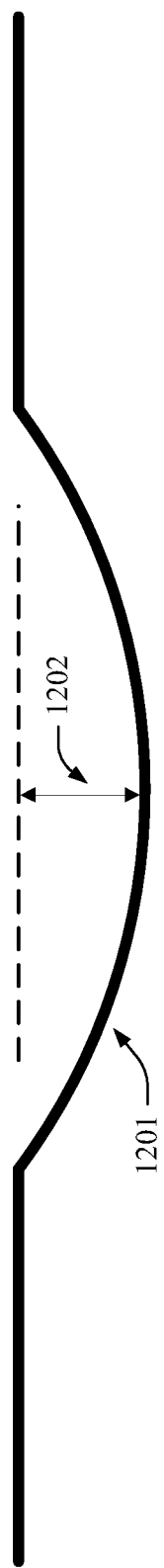
FIG. 12 depicts one embodiment of dimensions for aspects of a wafer level optic including a concave curve.

FIG. 12 illustrates an example concave stamping master for fabricating wafer level optics from replication materials, according to still other aspects. In some aspects, concave radius 1201 can have a maximum of 105% of a machining tool radius. Sag 1202 can represent the maximum sag, as defined according to the clear aperture and any blending applied to elements.

Figure 13:
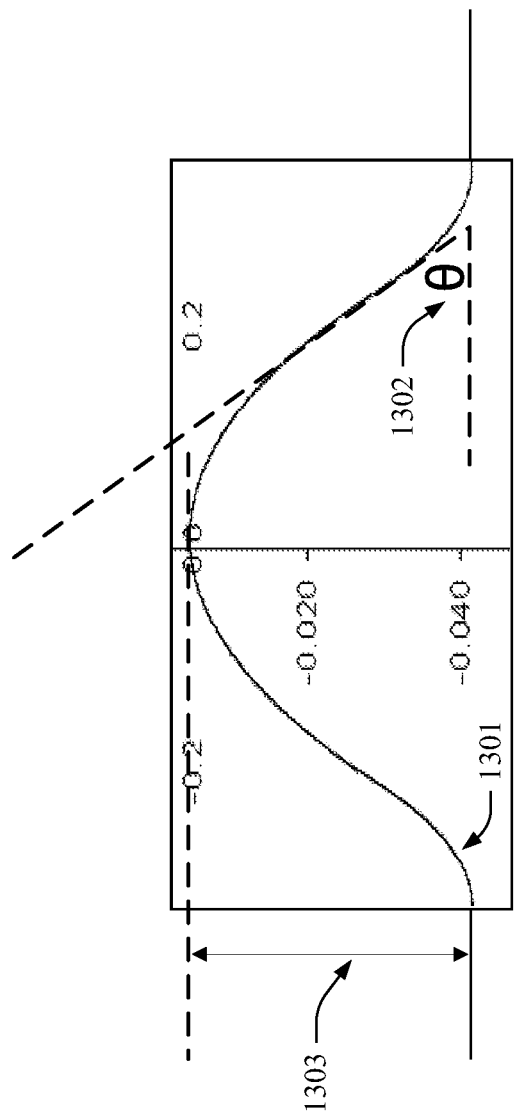
FIG. 13 illustrates one embodiment of dimensions for aspects of a wafer level optic including a low-field convex curve.

FIG. 13 displays a low-field convex-example of some aspects of dimensions for a wafer level optic. Radius 1301 can represent the minimum blend zone radius. In one embodiment, radius 1301 is dependent upon the radius of a diamond tool used to produce the optic. Slope 1302 ((Θ) can be the maximum lens slope. In one disclosed aspect, the maximum lens slope can be substantially 70 degrees. Maximum sag 1303 can be dependent upon the clear aperture and blending between surfaces.

Figure 14:
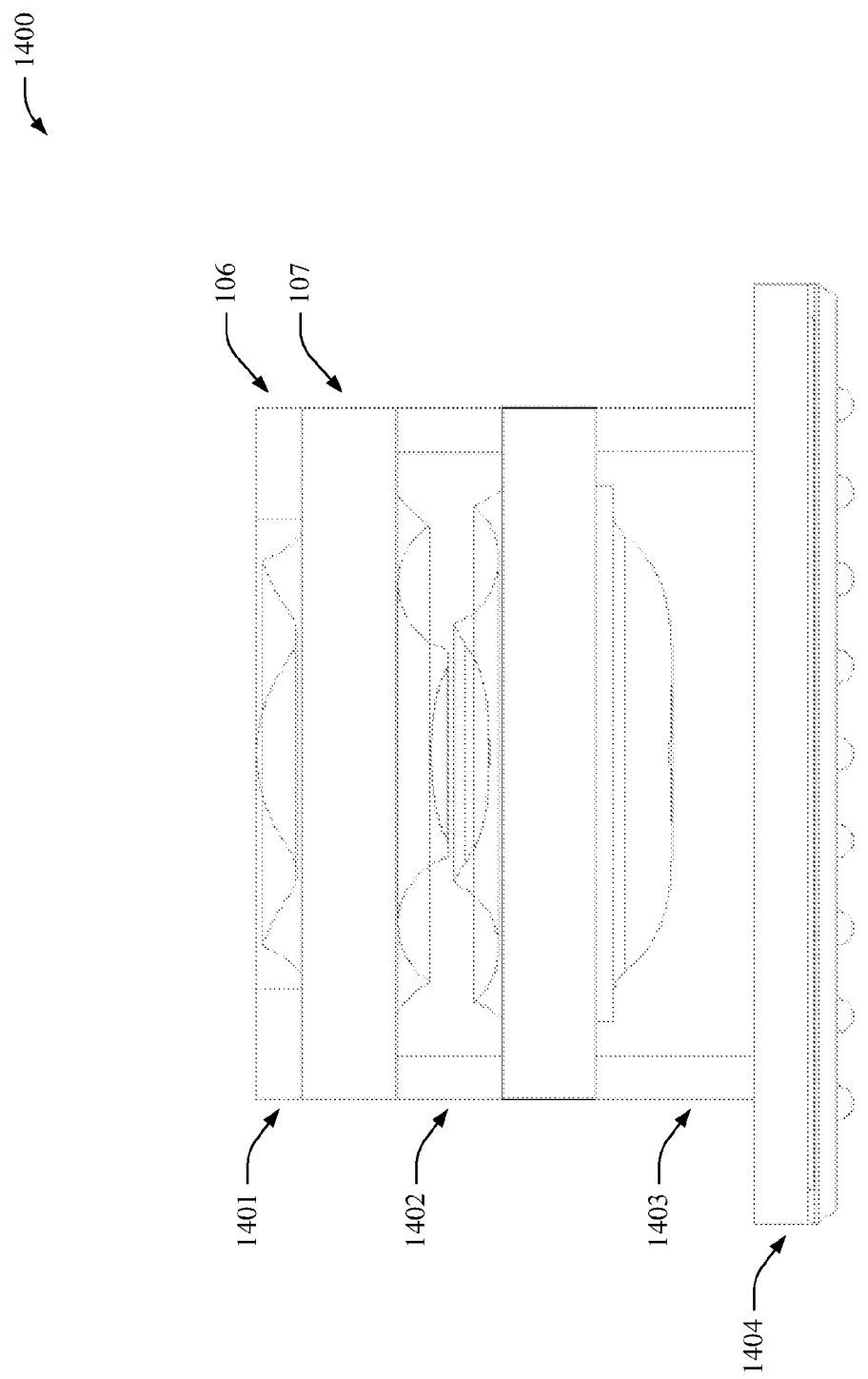
FIG. 14 depicts one embodiment of a wafer level optic.

FIG. 14 displays an optical system 1400 depicting some aspects of a wafer level optic. In one embodiment, the wafer level optic can be a camera. System 1400 can include optical elements 106 and 107 as described in FIG. 1. In an embodiment, system 1400 includes baffle 1401, a first spacer 1402, a second spacer 1403, and image sensor 1404. In some aspects, image sensor 1404 can be a wafer level packaged image sensor.

As used herein, certain designations may refer to materials that satisfy the specifications and constraint of the designs described. For example, the tables below include RM1 ("replication material 1") and RM2 ("replication material 2"). RM1 can be a suitable optical material for fabrication of a wafer level optical lens or similar optical component, with an Abbe number between substantially 48.5 and substantially 52.5, and having a refractive index between substantially 1.45 and substantially 1.65. In at least one specific aspect, RM1 can have a refractive index between substantially 1.51 and substantially 1.55, and an Abbe number in a range of substantially 50.0 to substantially 51.0. RM2 can be a suitable optical material for fabrication of a wafer level optical lens or similar optical component, with an Abbe number between substantially 32.5 and substantially 35.5, and having a refractive index between substantially 1.45 and substantially 1.65. In at least one specific aspect, RM2 can have a refractive index between substantially 1.55 and 1.59 and an Abbe number in a range of substantially 34.0 and 35.0.

As utilized herein, the word "exemplary" is intended to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

The following tables are intended to provide further details relating to one or more embodiments of the disclosure herein. In some instances, rows or columns of the same table may be split by line or page breaks in order to facilitate compact presentation. The optical properties of Tables 1-4 (and more generally the specification) are defined in ZEMAX Optical Design Software as available at http://www.zemax.com.

TABLE 1

General Properties for Optical System 100

| | |
|---|---|
| Surfaces (including apertures) | 17 |
| Stops | 4 |
| System Aperture | Float by stop size = 0.63 |
| Apodization | Uniform Factor = 0.00000E+000 |
| Temperature (C.) | 2.50000E+001 |
| Pressure (ATM) | 1.00000E+000 |
| Effective Focal Length | 3.822623 (in air at system temp & pressure) |
| Effective Focal Length | 3.822623 (in image space) |
| Back Focal Length | 0.05912762 |
| TTL | 4.184024 |
| Image Space F/# | 2.747547 |
| Paraxial Working F/# | 2.747562 |
| Working F/# | 2.950535 |
| Image Space NA | 0.1790391 |
| Stop Radius | 0.63 |
| Paraxial Image Height | 1.792 |
| Paraxial Magnification | −3.82E−06 |
| Entrance Pupil Diameter | 1.391286 |
| Entrance Pupil Position | 0.2317977 |
| Field Type | Real Image height in mm |
| Maximum Radial Field | 1.792 |
| Primary Wavelength | 0.546 μm |
| Lens Units | Millimeters |
| Angular Magnification | 1.434304 |

TABLE 2

Surface Data for Lens Elements for Optical System 100

| Surface | Type | Radius (mm) | Thickness (mm) | Diameter (mm) | Conic | Note |
|---|---|---|---|---|---|---|
| OBJ | Standard | Infinity | 100000 | 934004 | 0 | |
| 1 | Standard | Infinity | 0 | 1.576699 | 0 | |
| 2 | Even_Asph | 1.189087 | 0.3221304 | 1.42 | −0.5961545 | A Surface |
| 3 | Standard | Infinity | 0 | 1.293804 | 0 | |
| STO | Standard | Infinity | 0.7 | 1.26 | 0 | |
| 5 | Standard | Infinity | 0 | 2.08 | 0 | Stop |
| 6 | Standard | Infinity | 0.263153 | 2.08 | 0 | |
| 7 | Even_Asph | 2.5179 | 0.4262051 | 1.31 | 11.98103 | B Surface |

TABLE 2-continued

Surface Data for Lens Elements for Optical System 100

| Surface | Type | Radius (mm) | Thickness (mm) | Diameter (mm) | Conic | Note |
|---|---|---|---|---|---|---|
| 8 | Even_Asph | −22.1495 | 0.09574203 | 1.64 | 55.84553 | E Surface |
| 9 | Standard | Infinity | 0 | 3.3 | 0 | |
| 10 | Standard | Infinity | 0.7 | 3.3 | 0 | (Stop) |
| 11 | Standard | Infinity | 0 | 3.3 | 0 | (Stop) |
| 12 | Standard | Infinity | 0.6497394 | 3.3 | 0 | |
| 13 | Even_Asph | 1.609059 | 0.592053 | 3.32 | 108.9775 | F Surface |
| 14 | Standard | Infinity | 0.4 | 3.393211 | 0 | Cover glass |
| 15 | Standard | Infinity | 0.035 | 3.590949 | 0 | |
| 16 | Standard | Infinity | 0 | 3.618377 | | |
| IMA | Standard | Infinity | | 3.618377 | | |

TABLE 3

Aspheric Coefficients for Lenses 101 and 102 of Optical System 100

| | | |
|---|---|---|
| Surface | OBJ | STANDARD |
| Surface | R1 | STANDARD |
| Surface | R2 | EVENASPH A Surface |
| | Coeff on r 2 | 0 |
| | Coeff on r 4 | 0.081287249 |
| | Coeff on r 6 | −0.53530051 |
| | Coeff on r 8 | 3.0932103 |
| | Coeff on r 10 | −7.6894533 |
| | Coeff on r 12 | 6.9492425 |
| | Coeff on r 14 | 3.0568026 |
| | Coeff on r 16 | −6.5097371 |
| | Aperture | Floating Aperture |
| | Maximum Radius | 0.71 |
| Surface | R3 | STANDARD |
| Surface | STO | STANDARD |
| | Aperture | Circular Obscuration |
| | Minimum Radius | 0.63 |
| | Maximum Radius | 1.042282 |
| Surface | R5 | STANDARD Stop |
| | Aperture | Circular Obscuration |
| | Minimum Radius | 0.56 |
| | Maximum Radius | 1.04 |
| Surface | R6 | STANDARD |
| | Aperture | Floating Aperture |
| | Maximum Radius | 1.04 |
| Surface | R7 | EVENASPH B Surface |
| | Coeff on r 2 | 0 |
| | Coeff on r 4 | −0.076304541 |
| | Coeff on r 6 | 0.23779075 |
| | Coeff on r 8 | −0.29309087 |
| | Coeff on r 10 | −1.0564796 |
| | Coeff on r 12 | 0.92674095 |
| | Coeff on r 14 | 10.415239 |
| | Coeff on r 16 | −21.159331 |
| | Aperture | Floating Aperture |
| | Maximum Radius | 0.655 |
| Surface | R8 | EVENASPH E Surface |
| | Coeff on r 2 | 0 |
| | Coeff on r 4 | −0.34705393 |
| | Coeff on r 6 | 1.9072267 |
| | Coeff on r 8 | −12.150437 |
| | Coeff on r 10 | 42.247119 |
| | Coeff on r 12 | −81.448336 |
| | Coeff on r 14 | 79.539689 |
| | Coeff on r 16 | −30.162081 |
| | Aperture | Floating Aperture |
| | Maximum Radius | 0.82 |
| Surface | R9 | STANDARD |
| | Aperture | Floating Aperture |
| | Maximum Radius | 1.65 |

TABLE 3-continued

Aspheric Coefficients for Lenses 101 and 102 of Optical System 100

| | | |
|---|---|---|
| Surface | R10 | STANDARD (Stop) |
| | Aperture | Circular Obscuration |
| | Minimum Radius | 0.97 |
| | Maximum Radius | 1.7 |
| Surface | R11 | STANDARD (Stop) |
| | Aperture | Circular Obscuration |
| | Minimum Radius | 1.535 |
| | Maximum Radius | 1.7 |
| Surface | R12 | STANDARD |
| | Aperture | Floating Aperture |
| | Maximum Radius | 1.65 |
| Surface | R13 | EVENASPH F Surface |
| | Coeff on r 2 | 0 |
| | Coeff on r 4 | −0.064460058 |
| | Coeff on r 6 | −0.000510023 |
| | Coeff on r 8 | 0.010734974 |
| | Coeff on r 10 | −0.016152853 |
| | Coeff on r 12 | 0.008737382 |
| | Coeff on r 14 | −0.002206689 |
| | Coeff on r 16 | 0.000190949 |
| | Aperture | Floating Aperture |
| | Maximum Radius | 1.66 |
| Surface | R14 | STANDARD Cover glass |
| Surface | R15 | STANDARD |
| Surface | R16 | STANDARD |
| Surface | IMA | STANDARD |

TABLE 4

Index of Refraction for Lenses 101 and 102 of Optical System 100
System Temperature: 25.0000 Celsius
System Pressure: 1.0000 Atmospheres
Absolute Air Index: 1.000269 at wavelength 0.546000 μm
Index data is relative to air at the system temperature and pressure
Wavelengths are measured in air at the system temperature and pressure.

| | | | Index (for given wavelength in μm) | | | | |
|---|---|---|---|---|---|---|---|
| Surface | Temp | Pressure | 0.42 | 0.486 | 0.546 | 0.588 | 0.656 |
| 0 | 25 | 1 | 1 | 1 | 1 | 1 | 1 |
| 1 | 25 | 1 | 1 | 1 | 1 | 1 | 1 |
| 2 | 25 | 1 | 1.52-1.56 | 1.52-1.56 | 1.51-1.55 | 1.51-1.55 | 1.51-1.55 |
| 3 | 25 | 1 | 1.52-1.56 | 1.51-1.55 | 1.50-1.54 | 1.50-1.54 | 1.50-1.54 |
| 4 | 25 | 1 | 1.52-1.56 | 1.51-1.55 | 1.50-1.54 | 1.50-1.54 | 1.50-1.54 |
| 5 | 25 | 1 | 1.52-1.56 | 1.51-1.55 | 1.50-1.54 | 1.50-1.54 | 1.50-1.54 |
| 6 | 25 | 1 | 1.58-1.62 | 1.56-1.60 | 1.55-1.59 | 1.55-1.59 | 1.54-1.58 |
| 7 | 25 | 1 | 1 | 1 | 1 | 1 | 1 |
| 8 | 25 | 1 | 1.52-1.56 | 1.52-1.56 | 1.51-1.55 | 1.51-1.55 | 1.51-1.55 |
| 9 | 25 | 1 | 1.52-1.56 | 1.51-1.55 | 1.50-1.54 | 1.50-1.54 | 1.50-1.54 |
| 10 | 25 | 1 | 1.52-1.56 | 1.51-1.55 | 1.50-1.54 | 1.50-1.54 | 1.50-1.54 |
| 11 | 25 | 1 | 1.52-1.56 | 1.51-1.55 | 1.50-1.54 | 1.50-1.54 | 1.50-1.54 |
| 12 | 25 | 1 | 1.52-1.56 | 1.52-1.56 | 1.51-1.55 | 1.51-1.55 | 1.51-1.55 |
| 13 | 25 | 1 | 1 | 1 | 1 | 1 | 1 |
| 14 | 25 | 1 | 1.52-1.56 | 1.51-1.55 | 1.50-1.54 | 1.50-1.54 | 1.50-1.54 |
| 15 | 25 | 1 | 1 | 1 | 1 | 1 | 1 |
| 16 | 25 | 1 | 1 | 1 | 1 | 1 | 1 |

What is claimed is:

1. A fixed position optical system, comprising:
a first lens and a second lens having respective object side and image side surfaces, wherein at least one object side surface or at least one image side surface of the first lens or the second lens is an aspheric surface;
the first lens or the second lens comprising a compound lens including a plurality of optical elements bonded together, the plurality of optical elements comprising at least two optical materials having disparate index of refraction or disparate Abbe number; wherein:
the fixed position optical system has a total track length equal to or less than 5.0 millimeters, and
the first lens is a compound lens including a first optical element bonded to an object side surface of an optical plate and a second optical element bonded to an image side surface of the optical plate, the first optical element is comprised of a first replication material having an index of refraction between substantially 1.45 and substantially 1.6, and an Abbe number in a range between substantially 50 and substantially 60.

2. The fixed position optical system of claim 1, wherein the second lens is a compound lens.

3. The fixed position optical system of claim 1, wherein the first optical element comprises an object side surface having convex shape and is aspheric.

4. The fixed position optical system of claim 1, wherein the second optical element comprises an image side surface having concave shape and is aspheric.

5. The fixed position optical system of claim of claim 1, wherein the second optical element is comprised of a second replication material having an index of refraction between substantially 1.55 and substantially 1.65, and an Abbe number in a range between substantially 30 and substantially 40.

6. The fixed position optical system of claim 1, wherein the optical plate is made of a glass having a common Abbe number in a range between substantially 50 and substantially 60.

7. The fixed position optical system of claim 1, wherein the first lens has a positive refractive power.

8. The fixed position optical system of claim 1, wherein the second lens is a compound lens including a third optical element bonded to an object side surface of a second optical plate and a fourth optical element bonded to an image side surface of the second optical plate.

9. The fixed position optical system of claim 8, wherein the third optical element comprises an object side surface having a concave shape and is aspheric.

10. The fixed position optical system of claim 8, wherein the third optical element is comprised of a first replication material having an index of refraction between substantially 1.45 and substantially 1.6, and an Abbe number in a range between substantially 50 and substantially 60.

11. The fixed position optical system of claim 8, wherein the fourth optical element has an image side surface that is of concave shape near to an optical axis of the fixed position optical system.

12. The fixed position optical system of claim 11, wherein the image side surface has varying optical power that is positive at a vertex and becomes increasingly negative with increasing radial distance from the vertex.

13. The fixed position optical system of claim 8, wherein the fourth optical element is comprised of a first replication material having an index of refraction between substantially 1.45 and substantially 1.6, and an Abbe number in a range between substantially 50 and substantially 60.

14. The fixed position optical system of claim 8, wherein the second lens has negative refractive power.

15. The fixed position optical system of claim 1, wherein the total track length is equal to or less than substantially 4.2 millimeters.

16. The fixed position optical system of claim 1, wherein a ratio of total track length to image size is less than about 1.0.

17. The fixed position optical system of claim 16, wherein the ratio of total track length to image size is less than about 0.89.

18. The fixed position optical system of claim 1, wherein a focal length of the fixed position optical system is substantially 3.82.

19. The fixed position optical system of claim 18, wherein a ratio of a focal length of the first lens to the focal length of the fixed position optical system is less than substantially 0.848.

20. The fixed position optical system of claim 1, wherein an image produced by the fixed position optical system has a range of defocus distances of about 0.0 millimeters to about −0.028 millimeters.

21. The fixed position optical system of claim 1, having a chromatic focal shift of about 89 micrometers or less.

22. The fixed position optical system of claim 1, having a lateral color error of about 0.4 micrometers or less.

23. The fixed position optical system of claim 1, comprising an aperture stop positioned at an intersection of an object side optical element of the first lens and a glass plate of the first lens.

24. The fixed position optical system of claim 1, comprising a first field stop positioned at an intersection of an object side optical element of the second lens and a glass plate of the second lens.

25. The fixed position optical system of claim 1, comprising a second field stop positioned at an intersection of an image side optical element of the second lens and a glass plate of the second lens.

26. The fixed position optical system of claim 1, having an F# of about 2.74.

27. The fixed position optical system of claim 1, further comprising an image sensor comprising an array of photosensitive pixels.

28. The fixed position optical system of claim 27, wherein the image sensor comprises about three million pixels in the array.

29. The fixed position optical system of claim 27, comprising a pixel having about 1.75 micrometer pixel size.

30. The fixed position optical system of claim 1, wherein the first lens is a compound lens comprising a first optical element bonded to an object side of a first optical plate and a second optical element bonded to an image side of the first optical plate, and wherein the second lens is a compound lens comprising a third optical element bonded to an object side of a second optical plate and a fourth optical element bonded to an image side of the second optical plate.

31. The fixed position optical system of claim 30, the first optical element, third optical element and fourth optical element are formed of a first replication material (RM1), and the second optical element is formed of a second replication material (RM2).

32. The fixed position optical system of claim 31, wherein the respective replication materials RM1 and RM2 are selected from respective ones of a set of replication material classes, the set of replication material classes comprising: an epoxide and oxetane class, an acrylate and methacrylate class, a maleate ester class, a thiol and ene class, a vinyl ether class, a perfluorocyclobutyl class, a urethane class, and a siloxane class.

33. The fixed position optical system of claim 31, wherein RM1 or RM2 has a reflow temperature above 260 degrees centigrade.

34. The fixed position optical system of claim 31, wherein the first optical element, second optical element, third optical element and fourth optical element are formed with a stamping and curing process.

35. The fixed position optical system of claim 31, wherein the first optical element, second optical element, third optical element or fourth optical element is formed out of a master stamping die and cured with a curing process.

36. The fixed position optical system of claim 35, wherein the master stamping die forms a maximum slope angle of seventy degrees for at least one of the first optical element, the second optical element, the third optical element or the fourth optical element.

37. The fixed position optical system of claim 35, wherein the master stamping die provides a maximum sag height of about 600 microns for at least one of the first optical element, the second optical element, the third optical element or the fourth optical element.

38. The fixed position optical system of claim 35, wherein the master stamping die provides a minimum radius between adjacent lenses of an array of wafer level optic lenses of 105 percent of a cutting tool radius.

39. A wafer level camera module comprising:
an image sensor chip;
a transparent glass substrate and an image lens system;
the imaging lens system including first and second composite lenses;
the composite lenses arranged in multiple stages for forming an image of an object on an image plane of an image device;
each composite lens including a single, transparent mass of refractive material having two opposing refractive surfaces, wherein the two surfaces have different refractive indices and are made from different dispersive materials, and wherein the two surfaces are separated by a glass plate having optical surfaces of predetermined configurations and configurations that are made substantially complementary in contact by using a curing process; and
the first composite lens, a first aperture stop, a first field stop, a second field stop and the second composite lens, the substrate and the image sensor chip are arranged along an optical axis in order from the object side; wherein,
the first composite lens having a positive refractive power and a convex surface on its object side made of polymer forming a first predetermined polymer configuration, wherein the first predetermined polymer configuration is bonded to a first glass plate having a predefined optical surface facing the optical surface of the image side of the first polymer configuration and being substantially complementary, and
the first composite lens for providing a second polymer configuration including a concave surface on its image side near the optical axis which is bonded to the image side of the first glass plate having a predefined optical surface facing the optical surface of the object side of the second polymer configuration and being substantially complementary; and wherein,
the second composite lens having a concave surface on its object side near the optical axis made of polymer and forming a third predetermined polymer configuration, wherein the third polymer configuration is bonded to a second glass plate having a predefined optical surface facing the optical surface of the image side of the third polymer configuration and being substantially complementary, and
the second composite lens for providing a fourth polymer configuration having a concave surface on its image side near the optical axis which is bonded to the image side of the second glass plate, having a predefined optical surface facing the optical surface of the object image side of the fourth polymer configuration being substantially complementary.

40. A fixed position optical system, comprising:

a first lens and a second lens having respective object side and image side surfaces, wherein at least one object side surface or at least one image side surface of the first lens or the second lens is an aspheric surface;

the first lens or the second lens comprising a compound lens including a plurality of optical elements bonded together, the plurality of optical elements comprising at least two optical materials having disparate index of refraction or disparate Abbe number; wherein:

the fixed position optical system has a total track length equal to or less than 5.0 millimeters, and a ratio of total track length to image size is less than about 1.0.

* * * * *